United States Patent
Sexton

[15] 3,667,086
[45] June 6, 1972

[54] HAND TYPE FISH SCALING DEVICE

[72] Inventor: Paul A. Sexton, 235 Exeter Place, St. Paul, Minn. 55104

[22] Filed: Jan. 18, 1971

[21] Appl. No.: 107,238

[52] U.S. Cl....................................................17/66, 17/67
[51] Int. Cl.........................................................A22c 25/02
[58] Field of Search......................17/67, 65, 66, 68, 69, 1 R; 51/267

[56] References Cited

UNITED STATES PATENTS

| 1,642,802 | 9/1927 | Barry | 17/67 |
| 2,557,272 | 6/1951 | Gabriel | 17/67 |
| 2,884,658 | 5/1959 | Johnson | 17/67 |
| 3,270,368 | 9/1966 | Cook, Sr. et al. | 17/66 |
| 2,481,182 | 9/1949 | Waters | 17/67 X |
| 986,531 | 3/1911 | Wilson | 57/267 UX |

*Primary Examiner*—Samuel Koren
*Assistant Examiner*—J. F. Pitrelli
*Attorney*—Williamson, Palmatier & Bains

[57] ABSTRACT

A hand type fish scaling device is comprised of an elongate handle having a mounting member projecting from the forward end of the handle. The handle is hollow and is connected to one end of a flexible conduit, and the conduit is adapted to be connected to a faucet. A channel-shaped scaling blade and a channel-shaped hood are mounted on the mounting member so that a pair of passages are provided, through which water passes. Internal and external outlet ports are provided along the blade elements of the scaling blade so that the scaling blade is constantly washed during the scaling operation.

8 Claims, 4 Drawing Figures

PATENTED JUN 6 1972
3,667,086
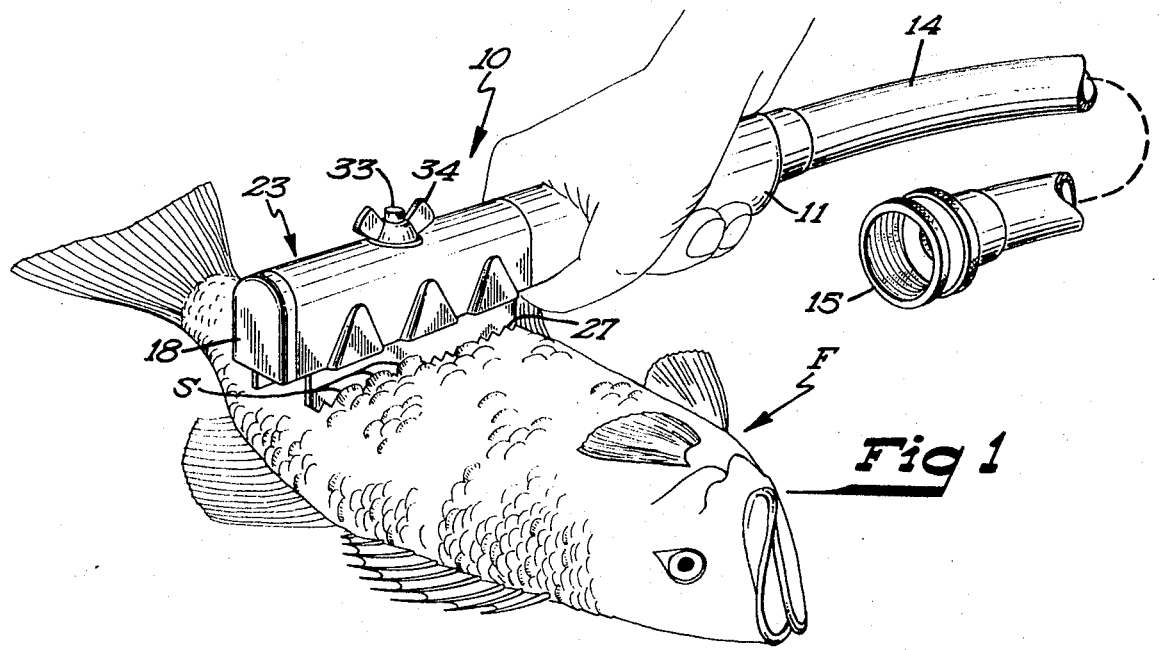
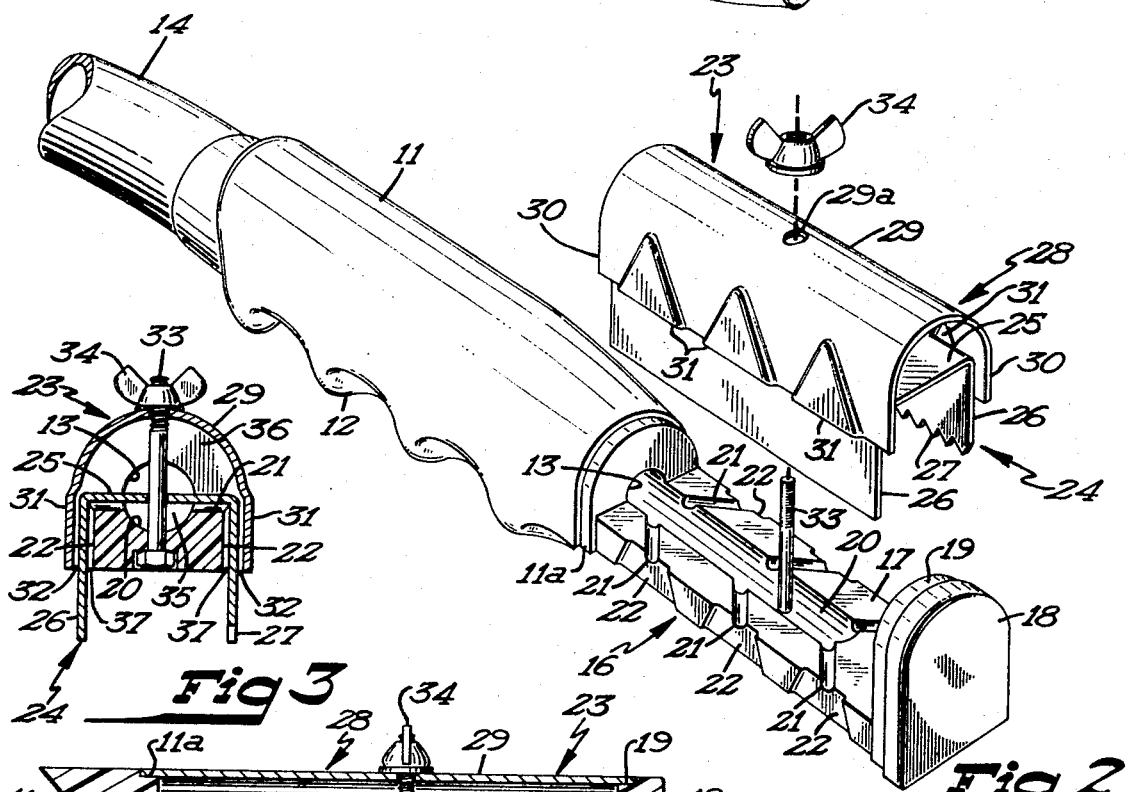
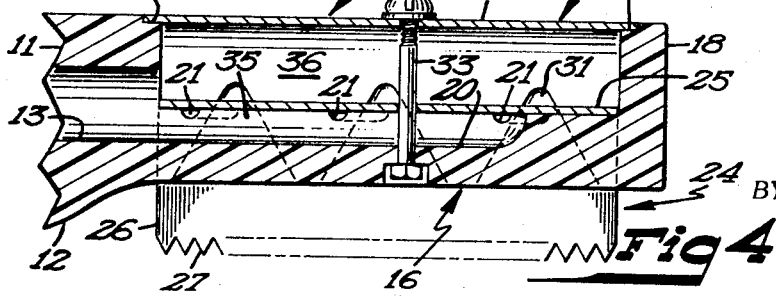
INVENTOR.
PAUL A. SEXTON
BY Williamson, Palmatier
& Bains
ATTORNEYS

HAND TYPE FISH SCALING DEVICE

SUMMARY OF THE INVENTION

Although there are several kinds of handle type fish scaling knives presently available, one of the problems associated with these conventional fish scaling knives is the need to clean the knife from time to time during the fish scaling operation. Ordinarily, a user must immerse the knife or blade in water during the fish scaling operation and this cleaning requirement is an annoying problem.

It is therefore a general object of this invention to provide a hand type fish scaling device which is constantly supplied with a source of water that is discharged along the fish scaling blade. In this regard, the fish scaling device includes a handle which is of hollow construction and which is connected by a conduit to a conventional faucet or the like. The fish scaling device is provided with a U-shaped blade which has outlet ports arranged throughout the length thereof so that water is constantly discharged along the blade during the scale removing operation. With this arrangement, the blade is constantly cleaned during the scaling operation thus obviating the necessity of interrupting the scaling procedure to wash the blade.

These and other objects and advantages of this invention will more fully appear from the following description made in connection with the accompanying drawings wherein like reference characters refer to the same or similar parts through the several views.

BRIEF DESCRIPTION OF THE FIGURES OF THE DRAWINGS

FIG. 1 is a perspective view of the novel fish scaling device illustrating the manner in which it is used;

FIG. 2 is a perspective exploded view of the device illustrating the details of construction thereof;

FIG. 3 is a transverse cross-sectional view thereof with directional arrows showing the flow of the water; and FIG. 4 is a longitudinal cross-sectional view of the device.

DETAILED DESCRIPTION OF THE INVENTION

Referring now to the drawings and more specifically to FIG. 2 it will be seen that one embodiment of my novel hand type fish scaling device, designated generally by the reference numeral 10, is there shown. The device 10 includes an elongate handle formed of a suitable rigid material such as plastic, metal or the like, and having a contoured gripping surface 12. The handle has a longitudinally extending passage 13 therethrough and the handle is connected at its rear end to one end of an elongate flexible conduit 14. The conduit 14 may be formed of any suitable flexible water impervious material such as the plastic or rubber of which the common garden hose is formed. The other end of the flexible conduit 14 is provided with an internally threaded conventional coupling 15 which may be readily applied in threaded engagement to a conventional externally threaded faucet. The conduit communicates with the passage 13 in the handle.

An elongate mounting member 16 is integrally formed with the front end of the handle and projects longitudinally therefrom. It will be noted that the mounting member 16 has a flat upper surface and is provided with an enlarged outer end 18. This enlarged outer end 18 is slightly reduced to define a shoulder 19. Similarly, the front end of the handle 11 is slightly reduced to define a shoulder 11a thereat. The mounting member 16 is of generally rectangular configuration having substantially flat upper and lower side surfaces.

A mounting member 16 has an elongate channel-shaped longitudinally extending central recess 20 formed in the upper surface thereof and this recess communicates at its rear end with the passage 13. It will be noted that the recess terminates adjacent but spaced from the outer end of the mounting member. The mounting member also is provided with a plurality of small angular recesses 21 in the upper surface thereof, these recesses extending outwardly and forwardly from opposite sides of the central recess 20. Thus the rear ends of the recesses 21 communicate with the central recess 20. The mounting member 16 has a plurality of trapezoidal-shaped recesses 22 formed in the sides thereof. These side recesses 22 are longitudinally spaced apart and each recess communicates at its upper end with one of the angular recesses 21.

The scaling device also includes a blade and hood structure 23 which is removably mounted on the mounting member 16. This blade and hood structure 23 includes an elongate channel-shaped scaling blade 24 which may be formed of a suitable rigid metallic material. The scaling blade is comprised of a web 25 having a pair of blade elements 26 integrally formed therewith and extending therefrom. It will be noted that one of these blade elements has a serrated edge 27 while the cutting edge of the other blade element is straight.

The blade and hood structure 23 also includes an elongate generally channel-shaped hood member 28 which may be formed of a suitable metal or plastic material. The hood member 28 includes a web portion 29 having flanges integrally formed therewith and extending therefrom. The scaling blade 24 may be fixedly secured to the hood member 28 as by welding or the like so that the blade and hood member are permanently secured together. It will be noted that the flanges 30 of the hood member have outwardly deformed portions 31 which define external ports 32 when the hood member is positioned in superimposed relation with respect to the blade 24.

The blade and hood structure 23 are removably mounted on the mounting member 16 by means of a bolt 33 which projects through registering openings in the mounting member, blade, and hood member respectively. The bolt 33 is provided with a wing nut which is shown threadly engaged to the bolt and engages the upper surface of the hood member 28. It will be noted that the head of the bolt 33 is positioned in a recess in the lower surface of the mounting member as best seen in FIG. 3.

When the blade and hood structure are mounted on the mounting member 16, a lower passage 35 is defined between the lower surface of the web 25 of the scaling blade 24 and the central recess 20 in the mounting member. In this regard, it will be noted that the web 25 of the blade is positioned upon the flat upper surface of the mounting member 16.

An upper passage 36 is also defined between the hood member and the blade and it will be noted that the upper passage 36 and the lower passage 35 communicate with the passage 13 in the handle 11. Similarly, the web of the scaling blade cooperates with the mounting member so that the angular recesses 21 also define passages which communicate with the lower passage 35. The blade elements of the scaling blade which are positioned against the flat sides of the mounting member cooperate therewith so that the side recesses 22 actually define internal ports 37 which discharge exteriorly adjacent the inner longitudinal edge portion of each blade element. The external ports 32 communicate with the upper passage 36 of the scaling device so that these ports discharge water outwardly along the external longitudinal edge portions of the blade elements.

It is pointed out that when the blade and hood structure 23 are mounted on the mounting member 16, the hood member 28 which is slightly longer than the scaling blade projects slightly longitudinally beyond the ends of the scaling blade. These end portions of the hood member are actually positioned upon the shoulders located at opposite ends of the mounting member.

The coupling 15 will be connected to a conventional faucet and the faucet valve will be opened to discharge water through the conduit 14. Water will pass through the passage 13 in the handle 11 and then into the upper passage 36 and the lower passage 35. The water will then be discharged through the external ports 32 along the outer longitudinal surfaces of the blade elements and through the internal ports 37 along the internal longitudinal surfaces of the blades. With this arrangement, water is constantly discharged along the scaling blade elements during the entire fish scaling operation.

The serrated edge 27 of the scaling blade will serve the leading edge to more efficiently remove the scales from the fish during use of the device. The water which is constantly discharged along the longitudinal edges of the scaling blade will maintain the blade elements in a clean condition throughout the scaling operation, thus obviating the need for constant cleaning of the blades. The fish being cleaned will also have the water discharged upon the surface of the skin being scaled and this arrangement maintains the fish in clean condition during the scale removing operation. It will also be seen that the blade and hood structure may be readily removed in the event that the blade is broken or worn and these parts may be readily replaced as desired.

Thus it will be seen that I have provided a novel hand type fish scaling device which may be of a size to very nicely and conveniently fit within a conventional tackle box. The use of this fish scaling device facilitates cleaning fish since both the fish and blade are constantly being washed with a steady flow of water.

Thus it will be seen that I have provided a novel fish scaling device which is not only of simple and inexpensive construction, but one which functions in a more efficient manner than any heretofore known comparable device.

What is claimed is:

1. A handle type fish scaling device comprises
    a handle,
    an elongate mounting member affixed to said handle and projecting longitudinally therefrom,
    an elongate blade and hood structure mounted on said mounting member and defining therewith elongate passage means, said blade and hood structure including an elongate blade for removing scales from a fish,
    a plurality of longitudinally spaced apart outlet ports along said blade communicating with said passage means,
    said passage means includes a pair of elongate passages extending longitudinally of said mounting member and said blade and hood structure, said outlet ports including a plurality of internal outlet ports positioned along one longitudinal edge of said blade and a plurality of external outlet ports positioned along the opposite longitudinal edge of said blade, one of said passages communicating with said external outlet ports and the other of said passages communicating with said internal outlet ports
    an elongate flexible conduit having one end thereof connected in communicating relation with said passage means, coupling means on the other end of said conduit to permit coupling of the conduit to a source of water under pressure whereby water under pressure will be supplied through said outlet ports along said blade.

2. The fish scaling device as defined in claim 1 wherein said mounting member is integrally formed with said handle, and said blade includes a pair of elongate laterally spaced apart blade elements, one of which is serrated.

3. The device as defined in claim 1 wherein said handle is of elongate hollow construction, said one end of said conduit being connected in communicating relation with one end of said handle.

4. A hand type fish scaling device comprises a handle, an elongate mounting member affixed to said handle and projecting longitudinally therefrom, an elongate blade and hood structure mounted on said mounting member and defining therewith elongate passage means, said blade and hood structure including an elongate blade for removing scales from a fish, a plurality of longitudinally spaced apart outlet ports along said blade communicating with said passage means, an elongate flexible conduit having one end thereof connected in communicating relation with said passage means, coupling means on the other end of said conduit to permit coupling of the conduit to a source of water under pressure whereby water under pressure will be supplied through said outlet ports along said blade, said blade is of generally channel-shaped configuration including a web having elongate blade elements integrally formed therewith and extending therefrom, said blade and hood structure including an elongate channel-shaped hood engaging said blade, said passage means including a pair of longitudinally extending passages defined by said blade, said hood, and said mounting member, said outlet ports including a plurality of internal outlet ports defined between each blade element and said mounting member, and a plurality of external outlet ports defined between said hood member and each of said blade elements, one of said passages communicating with said external outlet ports and the other of said passages communicating with said internal outlet ports.

5. The device as defined in claim 4 wherein said mounting member is of generally rectangular cross-sectional configuration having substantially flat opposed side surfaces, said side surfaces having recesses therein and cooperating with said blade elements of said blade to define said internal ports.

6. The device as defined in claim 4 wherein said handle is of elongate hollow construction, and said one end of said conduit being connected to one end of said handle.

7. The device as defined in claim 4 wherein one of said blade elements is serrated.

8. The device in claim 4 and readily releasable securing means releasably securing said blade and hood structure on said mounting means.

* * * * *